United States Patent
Norris et al.

(10) Patent No.: US 6,785,885 B2
(45) Date of Patent: Aug. 31, 2004

(54) MECHANISM FOR AUTOMATICALLY SECURING LICENSING FOR UNLICENCED CODEC

(75) Inventors: David J. Norris, Portland, OR (US); Ramanan V. Ganesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 09/752,797

(22) Filed: Dec. 28, 2000

(65) Prior Publication Data

US 2002/0087957 A1 Jul. 4, 2002

(51) Int. Cl.[7] .............................................. G06F 9/445
(52) U.S. Cl. ................... 717/178; 348/14.01; 709/200; 709/290; 386/46
(58) Field of Search .............................. 717/178, 172; 386/46, 109, 112; 370/521, 464, 473; 704/200, 201; 709/200, 246, 247; 348/14.01

(56) References Cited

U.S. PATENT DOCUMENTS

| | | | | |
|---|---|---|---|---|
| 5,644,364 A | * | 7/1997 | Kurtze et al. ................ 348/584 |
| 5,654,737 A | * | 8/1997 | Der et al. .................... 345/634 |
| 5,903,261 A | * | 5/1999 | Walsh et al. ............. 714/500.1 |
| 5,929,836 A | * | 7/1999 | Der et al. .................... 345/629 |
| 6,009,401 A | * | 12/1999 | Horstmann ...................... 705/1 |
| 6,014,651 A | * | 1/2000 | Crawford .................... 705/400 |
| 6,175,562 B1 | * | 1/2001 | Cave ......................... 370/352 |
| 6,216,152 B1 | * | 4/2001 | Wong et al. ................ 709/203 |
| 6,233,291 B1 | * | 5/2001 | Shukhman et al. ......... 375/341 |
| 6,233,567 B1 | * | 5/2001 | Cohen .......................... 705/59 |
| 6,314,565 B1 | * | 11/2001 | Kenner et al. .............. 717/171 |
| 6,334,189 B1 | * | 12/2001 | Granger et al. ............. 713/200 |
| 6,343,280 B2 | * | 1/2002 | Clark ........................... 705/55 |
| 6,357,047 B1 | * | 3/2002 | Kurtze et al. ............... 725/151 |
| 6,480,959 B1 | * | 11/2002 | Granger et al. ............. 713/189 |
| 6,498,791 B2 | * | 12/2002 | Pickett et al. ............... 370/353 |
| 6,499,035 B1 | * | 12/2002 | Sobeski .................. 707/103 R |
| 6,505,160 B1 | * | 1/2003 | Levy et al. ................. 704/270 |
| 6,508,709 B1 | * | 1/2003 | Karmarkar ................... 463/42 |
| 6,526,097 B1 | * | 2/2003 | Sethuraman et al. ..... 375/240.2 |
| 6,614,786 B1 | * | 9/2003 | Byers ......................... 370/353 |
| 6,628,644 B1 | * | 9/2003 | Nelson et al. .............. 370/352 |
| 6,636,506 B1 | * | 10/2003 | Fan ............................ 370/356 |

OTHER PUBLICATIONS

"SoftSENTRY" from www.halogram.com/sentry/index.html 1998 printed Mar. 10, 2004.*
"Microsoft Media Player", Stroud's Review of Microsoft Media Player, "http://cwsapps.txcyber.com", Jul. 18, 1998.*
"Using Quick time 4.0 Pro", version 1, Feb. 29, 1999.*
The Internet Unleased 1997 inu37.htm, Joe Krayer, 16 pages.*
The Authoritative Dictionary of IEEE Standards Terms seventh edition, pp. 182,381, published 2000.*
"Software Release Methodology", Michael E. Bays, pp. 177–185, published Jun. 23, 1999.*
Write Up From Examiner on activating a Plug–In on the USPTO Intranet and transfer control to Internet Webpage, pp. 1–3, printed Nov. 5, 2003.*

* cited by examiner

Primary Examiner—Todd Ingberg
(74) Attorney, Agent, or Firm—Michael R. Barre

(57) ABSTRACT

A method for licensing codecs in accordance with the invention includes initiating a call from a first endpoint, the first endpoint identifying a preferred codec, receiving the call at a second endpoint wherein a licensed copy of the preferred codec is not included, and generating a codec license request from the second endpoint to the first endpoint and/or at least one third party codec provider.

28 Claims, 6 Drawing Sheets

MECHANISM FOR AUTOMATICALLY SECURING LICENSING FOR UNLICENCED CODEC

BACKGROUND

1. Field

The present invention relates to audio/video (AV) encoding and decoding (codec) applications and, more specifically, to distribution and licensing of codecs.

2. Background Information

Growth and advancement in computing systems and high-speed data communications has, at least in part, enabled the growth of other technologies such as Internet Protocol (IP) Telephony and audio/video (AV) conferencing applications. In such technologies video and/or audio is typically compressed and/or encoded into electronic information by a sending computing system at an origination point. In this context, a computing system may comprise a personal computer (PC), an Internet appliance, a dedicated AV conferencing system or any number of other possible platforms. The compressed/encoded information is then typically transmitted to a destination point, via, for example, a network such as the Internet, or a direct digital connection, such as, for example, an Integrated Services Digital Network (ISDN) connection. A recipient computing system may then be employed for viewing and/or listening to the transmitted AV information. Such a recipient system typically decodes the electronic information. Such encoding and decoding is typically performed by employing a computing application implemented in either hardware or software, called a codec. Such codecs are well-known to those skilled in the art and are typically based on industry standards. One advantage of basing codecs on industry standards is that it promotes interoperability between computing systems. In this regard, it is typical that computing systems used for such purposes employ the same codec.

Codecs are typically "negotiated", at least in part, by the systems involved in such a call exchanging lists of licensed codecs they have available. The "best" codec common to both systems would then typically be selected for a call between those systems. The "best" codec may depend, at least in part, on the particular embodiment. For example, the "best" codec may be the codec with the fastest data transfer rate for one embodiment. Alternatively, the "best" codec for another embodiment may be the codec with the best AV quality. In this regard, were the sender and recipient systems to employ different codecs, it is very unlikely that the recipient would be able to decode electronic information sent to it by the sender, since that information would have been encoded with a codec not present on the recipient system. It bears mention that a "sender" would typically also act as a "recipient" and a "recipient" as a "sender" during, for example, IP telephony calls or AV conferences.

Currently, software codecs are typically distributed with applications that employ them for uses such as those mentioned above. Manufacturers typically obtain multiple licenses for such codecs, as there may be multiple owners of such codecs. These codecs are then distributed with, for example, IP telephony or AV conferencing applications, for unlimited use. In such licensing schemes it is typically very expensive to obtain a per-unit unlimited distribution right. In such a scheme, a license cost for unlimited use is typically factored into the product cost regardless of whether or not the codec is ultimately used by a consumer. Also, under such a scheme, if improved codecs are subsequently released, applications distributed with older codecs must be re-released with the new codecs in order to allow interoperability with systems employing the new codecs. Such techniques are typically both cost and time intensive. Therefore, new approaches to distributing and licensing codecs are desirable.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As was previously discussed, audio-visual (AV) coding and encoding applications (codecs) that may be employed by, for example, Internet-Protocol (IP) telephony or AV conferencing applications are typically distributed with a per product unlimited license. Such licensing and distribution schemes have certain disadvantages, such as cost and distribution concerns, for example. One alternative technique that has been proposed by certain codec manufacturers is to have notification sent, for example, via the Internet when a codec is first used. However, this technique merely notifies the codec licensor or owner that the codec has been delivered and used and does not adequately address the foregoing concerns. Therefore, as was previously indicated, alternative techniques for licensing and distributing such codecs are desirable.

Figure 1:
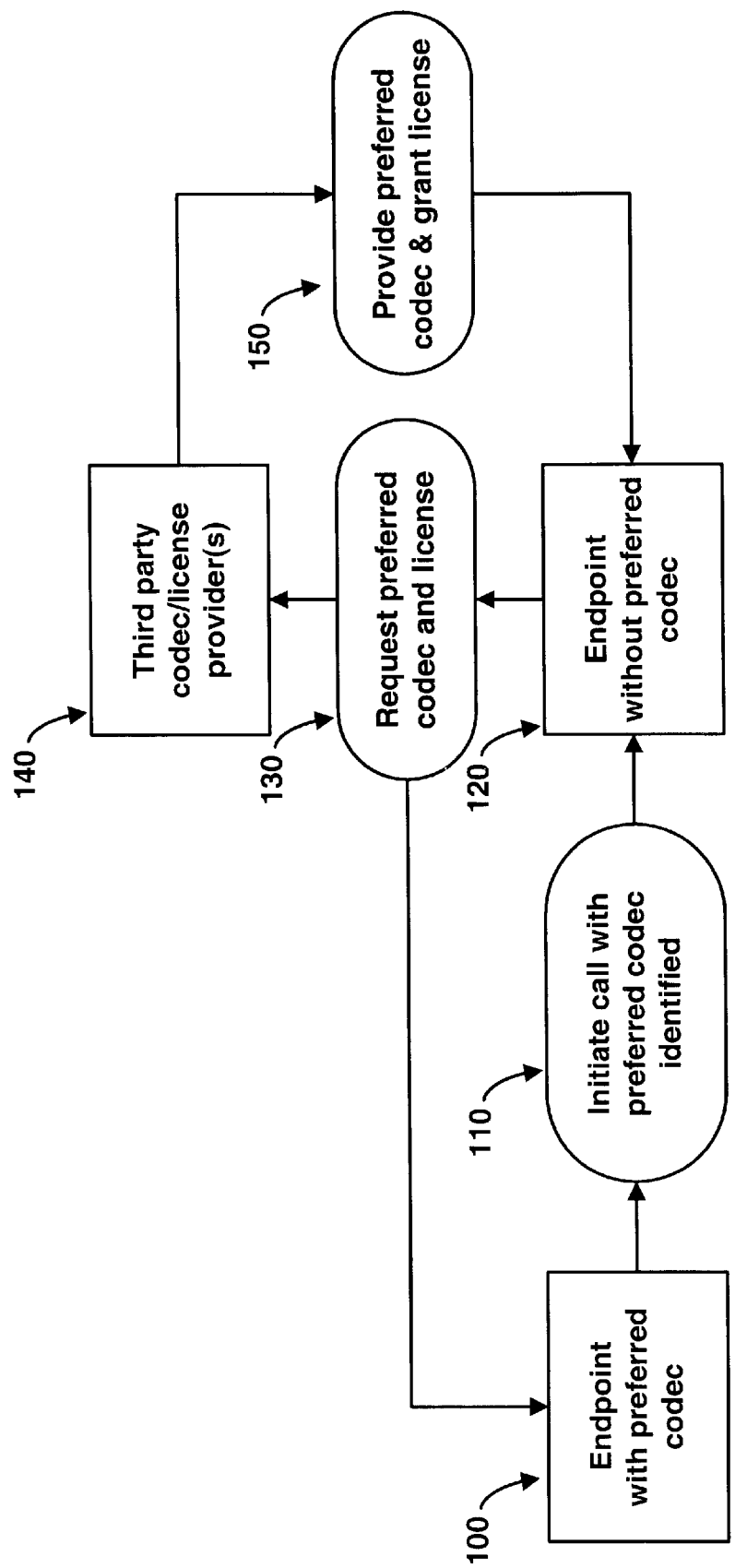
FIG. 1 is a block diagram illustrating a codec distribution and licensing scheme in accordance with an embodiment of the invention.

FIG. 1 is a block diagram illustrating a codec distribution and licensing scheme in accordance with an embodiment of the invention. In this particular embodiment, block 100 is an endpoint for a call. Such a call may comprise an IP Telephony call or an AV conference, for example, though the invention is not limited in scope in this respect. Block 100, for this embodiment, may comprise a computing system, such as previously discussed, including a preferred codec for such a call. Endpoint 100 initiates a call in block 110 with the preferred codec identified as desired for use during the call. Endpoint 120 may then receive the call from endpoint 100. For this embodiment, endpoint 120 initially does not include a copy of the preferred codec. Therefore, for this embodiment, endpoint 120 may then issue a codec license request, such as in block 130. Codec license request 130, for this scenario would comprise a request for a copy of the preferred codec as well as a request for a license to use that codec under certain conditions. Such conditions will be discussed in more detail hereafter. Codec license requests, for this particular embodiment, may be issued to one or more third party codec providers 140 and/or to endpoint 100. In another embodiment, the codec license request 130 may be issued only to a third party provider(s) or to endpoint 100, not both. For this embodiment, third party provider(s) 140 first provide a copy of the preferred codec to endpoint 120 and then generate a codec license grant for transmission to endpoint 120. Alternatively, for example, such a transaction may be accomplished by endpoint 100 providing the codec and the license grant or both endpoint 100 and third party provider(s) 140 providing the codec and the license grant.

Depending on the particular embodiment, a non-preferred codec may be employed for this call while endpoint 120 downloads the codec from third party providers(s) 140. In this particular scenario, the preferred codec may then be available for subsequent calls. Delaying use of the preferred codec would allow the current call connect more rapidly than, for example, waiting until the preferred codec is downloaded. Alternatively, endpoint 120 may complete the download of the preferred codec, receive the codec license grant from third party provider 140 and employ the preferred codec for this call. This would allow to current call to employ the preferred codec and obtain the advantages of such a codec over codecs currently available on, for this scenario, endpoint 120. Of course, other alternatives exist and the particular sequence of events may depend, at least in part, on the particular embodiment.

In the scheme illustrated in FIG. 1, a codec may be downloaded and a license for that may be granted at the time of use. Therefore, for such an embodiment, a per-product license would not be required, which may reduce product costs, as was previously discussed.

Additionally, such a scheme may also address the concerns related to distribution of "improved" codecs as were previous discussed. In this respect, were endpoint 120 to receive a call from endpoint 100 with an "improved" codec identified as the preferred codec, endpoint may obtain the "improved" codec and a license to use that codec in a similar fashion previously indicated. Such a technique, therefore, addresses the concern of having to re-release products with the "improved" codec. Employing a codec licensing and distribution scheme in accordance with invention, such as the present embodiment, would allow consumers to obtain the benefits of "improved" codecs without have to re-purchase the products employing these codecs.

Figure 2:
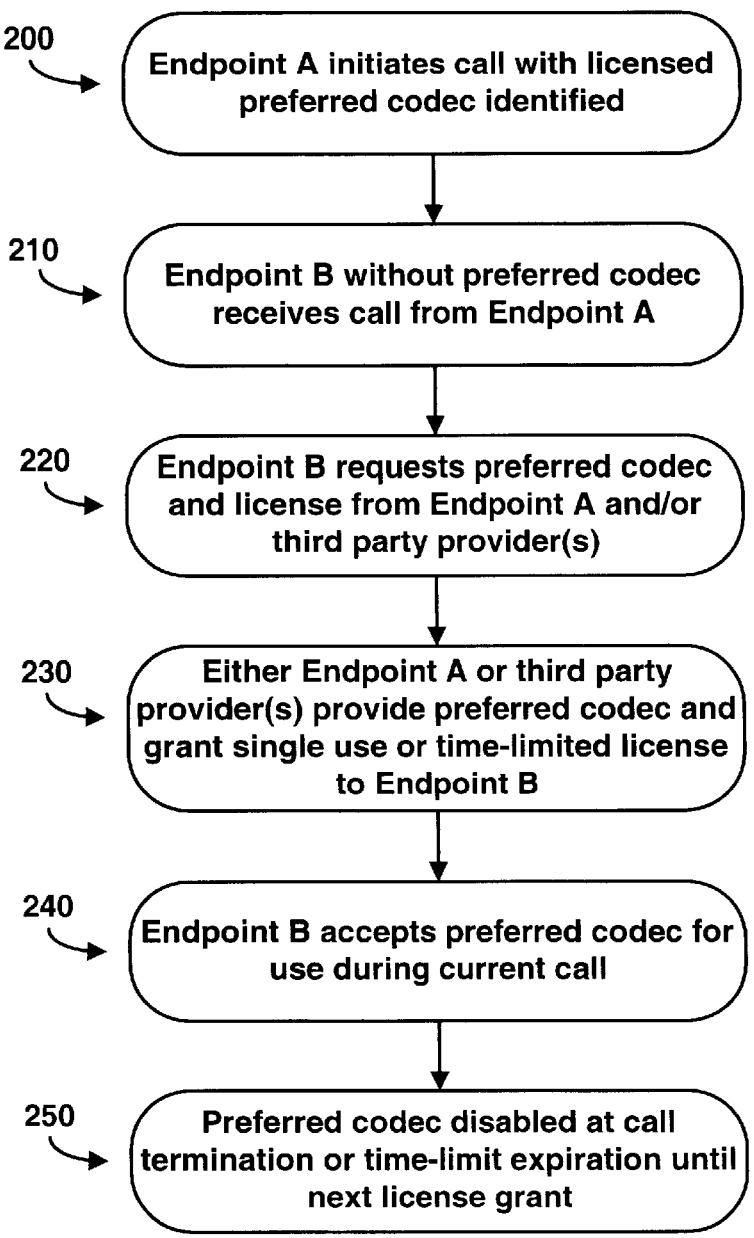
FIG. 2 is a flow diagram illustrating a codec distribution and licensing method in accordance with an embodiment of the invention.

FIG. 2 is a flow diagram of a method of codec distribution and licensing in accordance with an embodiment of the invention. Such a method may be accomplished by employing the mechanism as illustrated in FIG. 1, though the invention is not so limited. At block 200, endpoint A, which comprises a licensed copy of a preferred codec, initiates a call with the preferred codec identified. At block 210, endpoint B, which does not comprise a copy of, or a license for the preferred codec, receives the call. At block 220, endpoint B may request the preferred codec and a license from endpoint A and/or one or more third party providers. In this particular situation, endpoint A may comprise a "preferred" product, which is authorized to grant licenses to use the preferred codec. Such a "preferred" product may allow endpoint A to operate with better AV quality than a "standard" product. In this situation, though the invention is not so limited, endpoint A may provide a copy of the codec to endpoint B and then grant a single use license to endpoint B for this call only. For this situation, endpoint B may then download the preferred codec and receive the single use license, such as at block 230. At block 240, endpoint B may then employ the preferred codec for this call. At the call termination, the codec may then be disabled, such as at block 250. Typically, the codec would remain present at endpoint B to allow future use, which may then require only a license grant, as opposed to subsequent downloads of the codec. This approach may improve the efficiency of such subsequent calls.

Alternatively, at block 230, a third party provider may provide the preferred codec for download by endpoint B and then generate a time-limited codec license grant to endpoint B. Endpoint B may then receive the preferred codec and license and employ that codec for the current call, such as at block 240. If the time limit expires during the current call, for this scenario, the call would then be terminated at block 250. If the time limit did not expire during the current call, the codec would then be active for subsequent calls until such a time limit has expired. Such an approach, for example, may be useful for providing consumers with time-limited trial versions of such codecs prior to purchasing a license for the codec. Of course, other uses for such a time-limited license exist. For example, a consumer may desire to purchase a time limited license to meet his or her particular needs, as such a license may cost less than an unlimited license.

Figure 3:
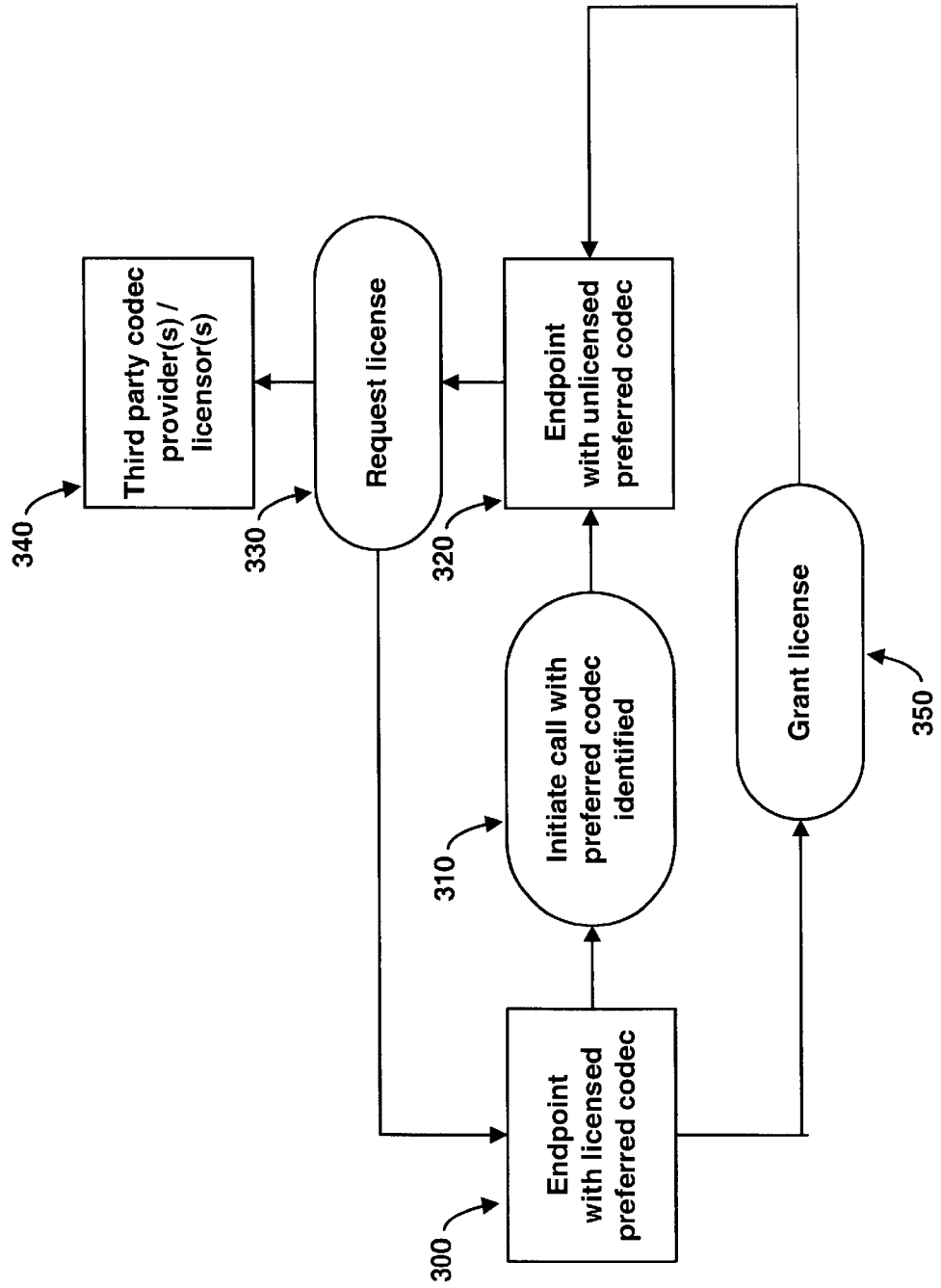
FIG. 3 is a block diagram illustrating a codec licensing scheme in accordance with an embodiment of the invention.

FIG. 3 is a block diagram illustrating a codec licensing scheme in accordance with the present invention. Such an approach is similar in some respects to the approach illustrated in FIG. 1. However, for this particular embodiment, endpoint 320 comprises an unlicensed copy of the preferred codec when a call with this codec identified as preferred is received from endpoint 300. This is in contrast to endpoint 120, which initially does not comprise a copy of the preferred codec for the approach illustrated in FIG. 1. In this regard, when endpoint 320 receives such a call from endpoint 300, endpoint 320 may then generate a codec license request that indicates the codec is present and, therefore, a download of the codec is not required, such as at block 330. This request may be issued to one or more third party provider(s)/licensor(s) 340 and/or endpoint 300, as has been previously discussed. For this particular embodiment, a codec license grant is issued to endpoint 320 by endpoint 300 at block 350. In such a situation, endpoint 300 may comprise a "preferred" product, as was previously discussed, though the invention is not so limited. Alternatively, for example, endpoint 300 may be a license granting authority for the owner of the preferred codec or may be the actual codec owner. Other alternatives, of course, exist.

Embodiments in accordance with the invention, such as the one illustrated in FIG. 3 address the cost concerns with current methods, as has been addressed. Additionally, such embodiments further address the distribution concerns discussed with respect to current techniques. In this regard, manufacturers of, for example, IP Telephony products, under such a scheme, may distribute their products with unlicensed copies of the most current codecs. This may alleviate the per-product license costs associated with current distribution and licensing techniques, leaving the end-user or consumer to obtain a license at the time of codec use. It may also improve the efficiency of such license transactions as downloads of such a codec would typically not be required. In this situation, a license grant to enable the codec would normally be sufficient. Such products may then employ a scheme such as that illustrated in FIG. 1 to obtain licensed copies of any "improved" codecs that may be subsequently released.

Figure 4:
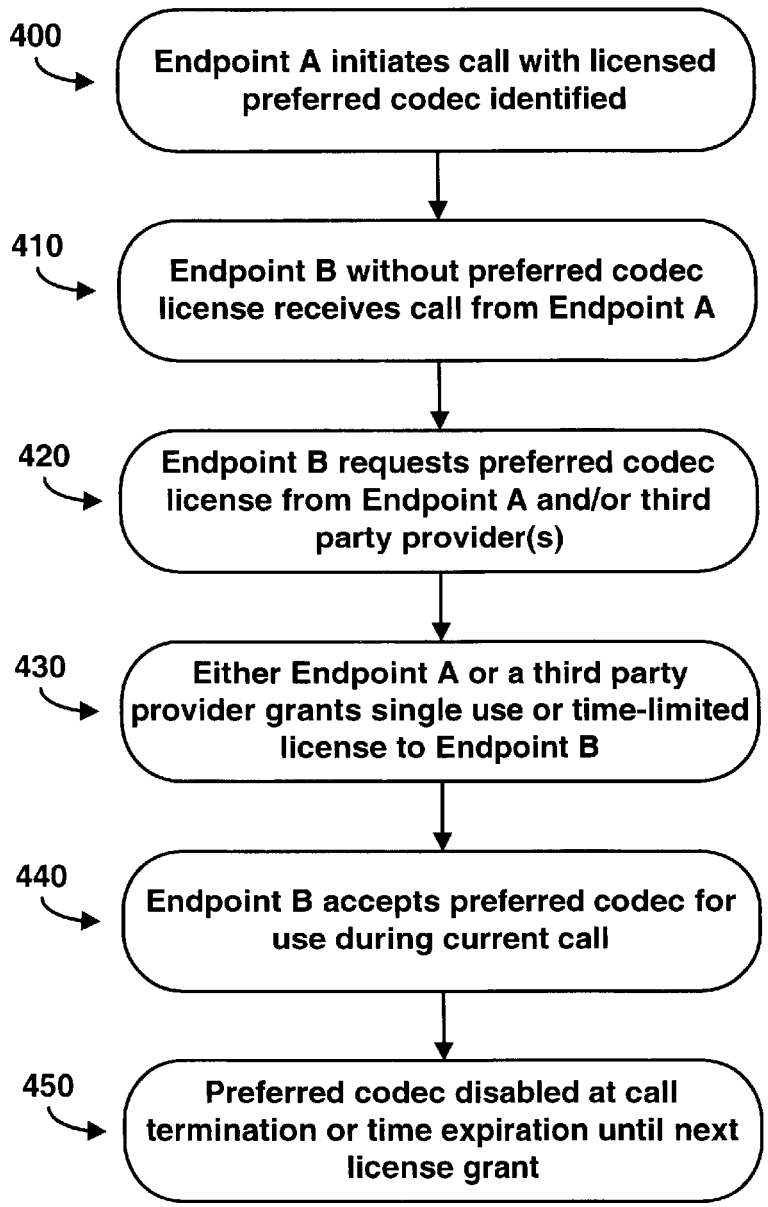
FIG. 4 is a flow diagram illustrating a codec licensing method in accordance with an embodiment of the invention.

FIG. 4 is a flow diagram illustrating an embodiment of a method of licensing codecs in accordance with the invention. This particular method may be employed by a scheme, such as the one illustrated in FIG. 3 to obtain a license for a preferred codec when an unlicensed copy of that codec already exist on a certain endpoint, such as endpoint 320, for example. At block 400, endpoint A initiates a call with a preferred codec identified. Then, at block 410, endpoint B receives this call and subsequently generates a codec license request to endpoint A and/or one or more third party providers. For this embodiment, either endpoint A or a third party provider may then grant a license, such as a single use or time-limited at block 430. In a similar manner as discussed with respect to FIG. 2, endpoint B may then employ the codec for the current call and the codec may be disabled at call termination or after the time limit has expired. Such embodiments may also have improved call efficiency due, at least in part, to the fact that a copy of the codec need not be downloaded.

Figure 5:
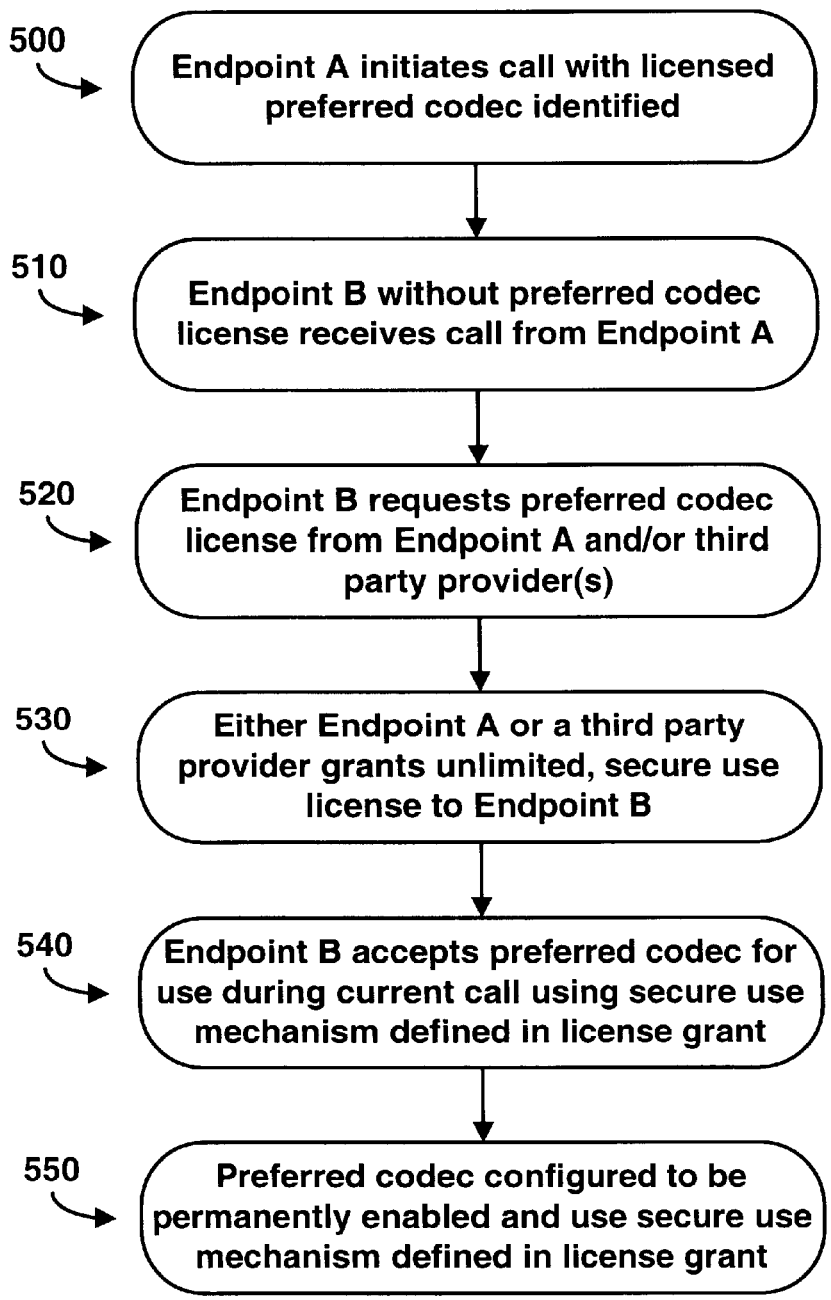
FIG. 5 is a flow diagram illustrating an alternative codec licensing method in accordance with another embodiment of the invention.

FIG. 5 is a flow diagram illustrating an alternative embodiment of a method of licensing codecs in accordance with the invention. Blocks 500, 510 and 520 may be executed in a substantially similar manner as blocks 400, 410 and 420, as illustrated in FIG. 4. For this embodiment, however, at block 530, either endpoint A or a third party provider may generate a codec license grant for unlimited, secure use. Such a license grant may contain information about a secure use mechanism to be employed while using such a codec, as will be discussed in more detail hereafter. At block 540, endpoint B, after receiving the license grant issued at block 530, may employ the preferred codec for the current call using the secure use mechanism defined in such a license grant. At the termination of such a call, the codec may then be permanently enabled and configured to use the secure use mechanism defined in the codec license grant.

Figure 6:
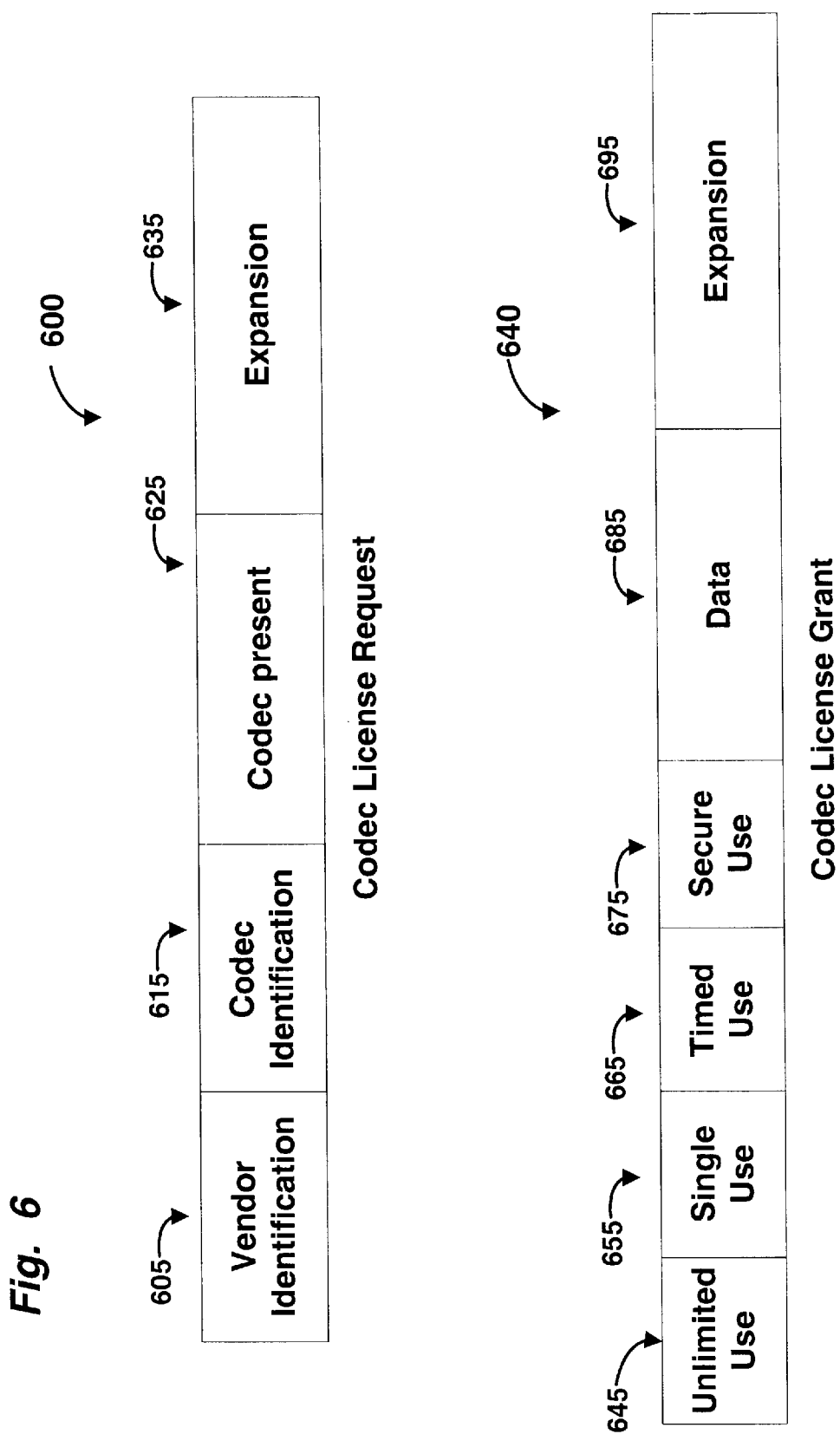
FIG. 6 discloses two tables illustrating embodiments of a codec license request and a codec license grant, which may be employed by codec distribution and licensing schemes and methods in accordance with embodiments of the invention, such as the embodiments illustrated in FIGS. 1–5.

FIG. 6 discloses two tables illustrating embodiments of a codec license request and a codec license grant that may be employed by codec distribution and licensing schemes and methods in accordance with the invention, such as those illustrated in FIGS. 1–5 and described herein. The table designated codec license request 600 comprises a plurality of data fields. In this context, a field represents information related to specific aspects of such a license request. Typically such information would be represented by digital electronic signals, though the invention is not so limited. For this particular embodiment, codec license request 600 comprises a vendor identification field 605, a codec identifications field 615, a codec present field 625, and an expansion field 635. Vendor identification 605 may comprise information related to the codec owner for a preferred codec for which a license request is being generated. Likewise, codec identification 615 may comprise information related to the particular codec owned by such a codec owner. Codec present 625 may indicate whether an unlicensed copy of the codec is present, the scenario illustrated in FIGS. 3–5, or that a copy of the codec is needed for download, as was discussed with regard to FIGS. 1 and 2. Expansion 635 may provide additional data space for information related to future enhancements in codec distribution and licensing schemes in accordance with the invention.

The table designated codec license grant 640 similarly comprises a plurality of data fields as discussed with respect to codec license request 600. For this particular embodiment, codec license grant 640 comprises an unlimited use field 645, a single use field 655, a timed use field 665, a secure use field 675, a data field 685, and an expansion field 695. Unlimited use 645, single use 655, and timed use 675 would typically be mutually exclusive. That is, only one type of license would typically be indicated in any given license grant. Secure use 675 may be used to indicate whether the codec is to be used securely, such as may be desired for confidential communications, for example. Data 685 may contain information related to time limits for timed use license grants and information about a secure use mechanism to be employed when using a particular preferred codec. Such secure use mechanisms are well known to those skilled in the art and may include well-known cryptographic methods such as, for example, Kerberos, Diffie-Hellman or secure certificates. The invention is, of course, not limited to any particular secure use mechanism. Expansion 695, as was discussed with respect to codec license request 600, may provide additional data space for future enhancements to codec distribution and licensing schemes and methods in accordance with the invention.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method comprising:

receiving, at a first computing system, a call between the first computing system and a second computing system, wherein the first computing system contains an unlicensed codec;

in conjunction with receiving the call, receiving a codec identifier from the second computing system at the first computing system, wherein the codec identifier identifies the unlicensed codec as desired for use during the call;

in response to receiving the codec identifier at the first computing system, transmitting a request for a license to use the unlicensed codec;

after transmitting the request for a license to use the unlicensed codec, receiving a response that grants the license; and after receiving the response that grants the license, automatically using the formerly unlicensed codec in the call.

2. A method according to claim 1, wherein the operation of transmitting a request for a license to use the unlicensed codec comprises transmitting an indication that a copy of the codec already exists on the first computing system.

3. A method according to claim 1, wherein the operation of transmitting a request for a license to use the unlicensed codec comprises transmitting the request to the second computing system.

4. A method according to claim 1, wherein the operation of receiving a response that grants the license comprises receiving the response from the second computing system.

5. A method according to claim 1, wherein the operation of transmitting a request for a license to use the unlicensed codec comprises transmitting the request to a third party.

6. A method according to claim 1, wherein the operation of receiving a response that grants the license comprises receiving the response from a third party.

7. A method according to claim 1, comprising:
receiving an authentication mechanism with the response that grants the license; and
using the authentication mechanism to provide security during the call.

8. A method according to claim 1, wherein the call involving the first and second computing systems comprises an Internet Protocol (IP) telephony call.

9. A method according to claim 1, wherein the call involving the first and second computing systems utilizes a direct digital connection.

10. A method according to claim 1, wherein the call involving the first and second computing systems comprises an audio/visual (AV) conference call.

11. A computing system comprising:
a storage medium;
a processor communicatively coupled to the storage medium; and
computer instructions encoded in the storage medium, wherein the computer instructions, when executed by the processor, cause the computing system to perform operations comprising:
receiving a call from another computing system;
in conjunction with receiving the call, receiving a codec identifier from the other computing system, wherein the codec identifier identifies a codec as desired for use during the call;
in response to receiving the codec identifier, determining whether the computing system contains an unlicensed copy of the codec;
if the computing system contains an unlicensed copy of the codec, transmitting a request for a license to use the codec;
after transmitting the request for a license to use the codec, receiving a response that grants the license; and
after receiving the response that grants the license, automatically using the formerly unlicensed copy of the codec in the call.

12. A computing system according to claim 11, wherein the operation of transmitting a request for a license to use the codec comprises:
transmitting an indication that the computing system already contains a copy of the codec.

13. A computing system according to claim 11, wherein the computer instructions comprises instructions to transmit the request for the license to the other computing system.

14. A computing system according to claim 11, wherein the computer instructions comprises instructions to transmit the request for the license to a third party.

15. A computing system according to claim 11, wherein the computer instructions comprises:
instructions to receive an authentication mechanism associated with the license; and
instructions to use the authentication mechanism to provide security during the call.

16. A computing system according to claim 11, wherein the call comprises an Internet Protocol (IP) telephony call.

17. A computing system according to claim 3, wherein the call comprises an audio/visual (AV) conference call.

18. A computing system according to claim 11, wherein the call utilizes a direct digital connection.

19. A program product comprising:
a machine accessible medium; and
instructions encoded in the machine accessible medium, wherein the instructions, when executed by a processing system, cause the processing system to perform operations comprising:
receiving a call from another processing system;
in conjunction with receiving the call, receiving a codec identifier from the other processing system, wherein the codec identifier identifies a codec as desired for use during the call;
in response to receiving the codec identifier, automatically determining whether the processing system contains an unlicensed copy of the codec;
if the processing system contains an unlicensed copy of the codec, transmitting a request for a license to use the codec;
after transmitting the request for a license to use the codec, receiving a response that grants the license; and
after receiving the response that grants the license, automatically using the formerly unlicensed copy of the codec in the call.

20. A program product according to claim 19, wherein the operation of transmitting a request for a license to use the codec comprises:
transmitting an indication that the processing system already contains a copy of the codec.

21. A program product according to claim 4, wherein the instructions comprise instructions to transmit the request for the license to the other processing system.

22. A program product according to claim 19, wherein the instructions comprise instructions to transmit the request for the license to a third party.

23. A program product according to claim 19, wherein the instructions comprises:
Instructions to receive an authentication mechanism associated with the license; and
instructions to use the authentication mechanism to provide security during the call.

24. A program product according to claim 19, wherein the call comprises an Internet Protocol (IP) telephony call.

25. A program product according to claim 19, wherein the call comprises an audio/visual (AV) call.

26. A program product according to claim 19, wherein the call utilizes a direct digital connection.

27. A method comprising:
initiating a call to a second computing system from a first computing system;
transmitting a codec identifier from the first computing system to the second computing system, wherein the codec identifier identifies a codec as desired for use during the call;
after transmitting the codec identifier to the second computing system, receiving a response from the second computing system, wherein the response indicates that the second computing system contains an unlicensed copy of the codec;
after receiving the response, automatically transmitting a license grant for the codec from the first computing system to the second computing system; and
after transmitting the license grant to the second computing system, using the codec during the call.

28. A method according to claim 27, wherein the call comprises an audio/visual (AV) conference call.

* * * * *

UNITED STATES PATENT AND TRADEMARK OFFICE
CERTIFICATE OF CORRECTION

PATENT NO. : 6,785,885 B2
DATED : August 31, 2004
INVENTOR(S) : Norris et al.

It is certified that error appears in the above-identified patent and that said Letters Patent is hereby corrected as shown below:

Column 7,
Line 1, after "1," insert -- further --.
Line 59, delete "3," after insert -- 11, --.

Column 8,
Line 26, delete "4," and insert -- 19, --.

Signed and Sealed this

Twenty-first Day of June, 2005

JON W. DUDAS
*Director of the United States Patent and Trademark Office*